US 6,740,299 B2

(12) United States Patent
Carini et al.

(10) Patent No.: US 6,740,299 B2
(45) Date of Patent: May 25, 2004

(54) METHOD OF MANUFACTURE OF PHOSPHATE-BONDED REFRACTORIES

(76) Inventors: George F. Carini, 729 Washington Ave., Apartment 14, Carnegie, PA (US) 15106; George F. Carini, II, 729 Washington Ave., Apartment 14, Carnegie, PA (US) 15106

( * ) Notice: Subject to any disclaimer, the term of this patent is extended or adjusted under 35 U.S.C. 154(b) by 336 days.

(21) Appl. No.: 09/858,916

(22) Filed: May 16, 2001

(65) Prior Publication Data
US 2003/0003039 A1 Jan. 2, 2003

(51) Int. Cl.$^7$ ................................. C01B 25/36
(52) U.S. Cl. ................... 423/311; 423/314; 501/127
(58) Field of Search ................ 423/311, 314; 501/127

(56) References Cited

U.S. PATENT DOCUMENTS

| 3,284,218 | A | | 11/1966 | King ........................ 106/65 |
|---|---|---|---|---|
| 3,801,704 | A | * | 4/1974 | Kobayashi et al. ......... 423/311 |
| 4,324,773 | A | * | 4/1982 | Chai et al. .................. 423/311 |
| 4,364,855 | A | * | 12/1982 | McDaniel et al. .......... 423/311 |
| 4,459,156 | A | | 7/1984 | Henslee et al. ............... 106/85 |
| 4,542,001 | A | * | 9/1985 | Iino et al. .................... 423/311 |
| 4,833,576 | A | | 5/1989 | Mers et al. .................. 362/226 |
| 4,990,217 | A | * | 2/1991 | Philippot et al. ........... 156/621 |
| 5,496,529 | A | | 3/1996 | Fogel et al. ................. 423/305 |
| 5,707,442 | A | | 1/1998 | Fogel et al. ................. 106/629 |
| 6,022,513 | A | * | 2/2000 | Pecoraro et al. ............ 423/311 |
| 6,258,742 | B1 | * | 7/2001 | Carini et al. .................. 501/94 |

FOREIGN PATENT DOCUMENTS

RU            1458340            2/1989

* cited by examiner

Primary Examiner—Wayne A. Langel
(74) Attorney, Agent, or Firm—Webb Ziesenheim Logsdon Orkin & Hanson, P.C.

(57) ABSTRACT

A method of manufacturing a phosphate-bonded refractory product entirely during the mixing cycle by reacting phosphoric acid and alumina derived from one or more sources of finely divided reactive alumina, for example β-alumina and/or alumina hydroxide to form a proto aluminum orthophosphate gel or paste binder in the pan of a high-intensity mixer at ambient temperatures.

6 Claims, No Drawings

METHOD OF MANUFACTURE OF PHOSPHATE-BONDED REFRACTORIES

BACKGROUND OF THE INVENTION

This invention relates to phosphate-bonded refractory compositions and to a method of manufacture.

Phosphate-bonded refractories have been used extensively in the iron, steel, aluminum, and brass industries to line vessels for containment of molten metals and other applications for more than 50 years. These products are well known for their ability to withstand high temperatures and attack by molten metals and slags. They are further characterized by ease of forming, linear and volume stability, high strength both dried and fired, and excellent resistance to abrasion and to mechanical impact at high temperatures. The full range of phosphate-bonded refractories, including chemically bonded and fired brick, monoliths, and special shapes suitable for use in a wide range of high temperature applications, can be produced by the manufacturing method of the present invention.

It has long been recognized by individuals skilled in the design, formulation, and manufacture of refractory products that a proto aluminum phosphate chemical binder could be formed by pre-reacting a source of aluminum and phosphoric acid at elevated temperatures. Aluminum orthophosphate ($AlPO_4$ or $Al_2O_3.P_2O_5$) and aluminum metaphosphate ($Al(PO_3)_3$ or $Al_2O_3.3P_2O_5$), formed in the product after drying and firing, are refractory compounds with melting points of 1500° C. and 1537° C., respectively. The molar ratio of $Al_2O_3$ to $P_2O_5$ is 1:1 in aluminum orthophosphate, and the molar ratio is 1:3 in aluminum metaphosphate. Each compound is a well-defined inorganic substance having, within limits, definite chemical, physical, and electrical properties. It has long been a practice in the refractories industry to heat the phosphoric acid and aluminum source at temperatures greater than 100° C. to activate and drive the reaction between the phosphoric acid and aluminum source to form either aluminum orthophosphate or aluminum metaphosphate in an amorphous form. The prior art references of record in this application include U.S. Pat. No. 5,496,529 (hereinafter '529) and U.S. Pat. No. 5,707,442 (hereinafter '442) to Fogel et al. and SU 1458340 to Kuz'menkov et al. (hereinafter Kuz'menkov et al.). Fogel et al., in the '529 and '442 references, describe the prior art, and demonstrate that by admixing aluminum and phosphoric acid in an Al/P molar ratio of approximately 1 at about 100° C., a very viscous suspension is formed which is difficult to dry and difficult to use. Fogel et al. observed that the sources of aluminum and phosphoric acid do not react with one another to yield aluminum phosphates without heating to temperatures above 100° C. Kuz'menkov et al. is more specific and requires mixing $Al(OH)_3$ with heated $H_3PO_4$ at a mole ratio of 1:(0.9–1.1). The working time and bonding strength of the phosphate binder are increased in the manufacture of composite materials when the binder components are mixed at 102° C. to 112° C. in the presence of HCl. The physical characteristics of the phosphate binder obtained by Kuz'menkov et al. would unquestionably be the same as that described by Fogel et al. in the '442 and '529 references. We are in complete agreement with the Fogel et al. observations regarding the extreme difficulties encountered working with a pre-reacted proto aluminum phosphate paste.

When a source of at least one aluminum compound and phosphoric acid are pre-reacted at temperatures greater than 100° C. to form a proto aluminum phosphate chemical binder, the resulting gel or paste is highly viscous and difficult to incorporate into a refractory composition. Similarly, when preparing a refractory composition having an aluminum phosphate chemical binder, it was difficult to admix the refractory filler with the binder because of the highly viscous physical characteristic of the pre-reacted proto aluminum phosphate paste. Consequently, it would be both expensive and difficult to manufacture phosphate-bonded refractory products following the Kuz'menkov et al. practice of pre-reacting $Al(OH)_3$ and $H_3PO_4$ at 102° C. to 112° C.

It has been common practice to decrease the viscosity of proto aluminum phosphate paste by adding water to the paste. The addition of water is made to thin the paste to form a slurry. The decreased viscosity of the binder facilitates the admixing of refractory materials or fillers to create a refractory composition. However, the dilution of the paste with water causes increased porosity and permeability that is detrimental to the quality and functionality of the final refractory composition.

Were the dry aluminum phosphate products obtained following the Fogel et al. art used in the manufacture of phosphate-bonded refractory specialty products, the aluminum phosphate would be required to be finely divided and consequently milled or ground to pass substantially a 200 mesh US Standard screen. The finely divided aluminum phosphate would be introduced to the mixer with the batch ingredients and uniformly distributed. It must be recognized that both aluminum orthophosphate and aluminum metaphosphate are insoluble in water. Consequently, even with the addition of water, the finely divided aluminum phosphate would not provide a coating for the refractory grains, either in the aggregate or the matrix, nor would the finely divided aluminum phosphate contribute to the development of the plasticity or workability required in the finished product. To develop plasticity in a refractory product formulated following the Fogel et al. art, the addition of clay, such as a plastic Tennessee ball clay, would be required. This addition of clay would decrease the refractoriness of the matrix and be undesirable.

It has long been known that the shelf life (measured by the time plasticity, workability or consistency is maintained) of refractory materials containing proto aluminum phosphate chemical binders formed by pre-reacting phosphoric acid and an aluminum source at temperatures greater than 100° C., is markedly decreased and undesirable. It has long been common practice to add citric acid, oxalic acid, or hydrochloric acid to maintain the plasticity, workability or consistency of the refractory material for a period of 30 days. Without the addition of these sequestering agents, the shelf life of the refractory composition would be decreased and unsuitable for use. These sequestering agents add substantially to the raw material costs of the product being manufactured.

The manufacture of a proto aluminum phosphate chemical binder by pre-reacting a source of aluminum with phosphoric acid at temperatures greater than 100° C. requires expensive and specialized capital equipment. This specialized equipment would include: reaction vessels which can be heated in excess of 100° C.; control hoods and scrubbers capable of withstanding highly corrosive phosphoric acid fumes at elevated temperatures; and equipment capable of moving the highly viscous pre-reacted aluminum phosphate paste from the reaction vessel into a mixer in which a refractory composition could be created. Facilities manufacturing refractory compositions that include a pre-reacted proto aluminum phosphate chemical binder are subject to regulatory scrutiny by both the Federal Environmental Protection Agency, the Federal Occupation, Safety and Health Administration, and equivalent state regulatory agencies. It is estimated that the additional cost of manufacturing a phosphate-bonded refractory composition, directly attributable to the need to pre-react a proto aluminum phosphate chemical binder in the preparation of a refractory composition, would range between 10 percent and 20 percent of the total cost of the finished refractory composition. Our invention eliminates these costs.

The parameters governing the reaction process between a source of aluminum and phosphoric acid have never been described. We have found experimentally, for example, that α-alumina (α-$Al_2O_3$), corundum, and the aluminum oxyhydroxides (AlO(OH)), boehmite and diaspore, will not react with 75 percent or 85 percent orthophosphoric acid at ambient temperatures. We have disclosed in our co-pending U.S. patent application Ser. No. 09/329,522, filed Jun. 10, 1999 entitled "Method of Manufacture of Phosphate-Bonded Refractories" that aluminum hydroxide and 75 percent or 85 percent orthophosphoric acid will react at ambient temperatures where the surface area of the aluminum hydroxide sufficiently high to initiate the reaction. Were the grain size of the aluminum hydroxide too coarse, the surface area would be too low to promote the reaction. By milling the aluminum hydroxide to pass a 200 mesh screen, it was found that the reaction would proceed at ambient temperature without the application of external heat energy applied by conduction, convection, or radiation. The time required to form a paste without aggressive mixing is measurable in hours. We found that by mixing at high speeds, the rate of reaction of the finely divided aluminum hydroxide and phosphoric acid increased significantly. The time required to form a paste when agitated was decreased to minutes. On a commercial scale, which requires batches in the range of 2000 lbs., it was found that the modern high-intensity or high-efficiency mixers would provide the energy necessary to drive the reaction of aluminum hydroxide and phosphoric acid to form a paste in the mixing pan in a short time period. In the production of one ton batches of phosphate-bonded specialty refractory products, the objective is a mixing time of 5 minutes or less. This objective was met in the manufacture of refractory products according to our co-pending application.

The Fogel et al. '442 and '529 references teach the preparation of amorphous aluminum phosphate in the dry form or state by reacting an aluminum oxide, hydroxide, or oxyhydroxide with phosphoric acid in a liquid reaction medium and then spray or freeze drying the suspension. Aluminum phosphates in the dry form or state cannot be used to practice our invention without severely impairing product quality and substantial additional cost. It would be impossible to practice our invention by application of the Fogel et al. '442 and '529 process methods. Obviously, the only commonality between our teaching and those of the Fogel et al. '442 and '529 references is the use of aluminum hydroxide and orthophosphoric acids. Similarly, to practice the Kuz'menkov et al. art, the use of a paste or liquid slurry formed by mixing the paste and water would be required. We do not teach the incorporation of pre-reacted aluminum phosphate powders or pre-reacted aluminum phosphate liquids processed at temperatures greater than 100° C. in practicing our invention.

Our co-pending application describes a method of manufacturing phosphate-bonded refractories having a proto aluminum orthophosphate ($AlPO_4$ or $Al_2O_3 \cdot P_2O_5$) chemical binder. The chemical binder is formed by reacting 75 or 85 percent orthophosphoric acid and finely divided aluminum hydroxide at a molar ratio of 1:1. The finely divided aluminum hydroxide is combined with the dry refractory batch components in the pan of a high-efficiency or high-intensity mixer. The batch is blended for one to two minutes to distribute the aluminum hydroxide uniformly. During continuous mixing, water is then added. Following this initial water addition, 75 or 85 percent orthophosphoric acid is added with continued mixing. The required remaining water is added and mixing is completed after an additional two to three minutes. This sequence of mixing is critical. Were the finely divided aluminum hydroxide added to the batch following the addition of orthophosphoric acid and the initial water, it would be extremely difficult, if not impossible, to uniformly distribute the finely divided aluminum hydroxide in the matrix of the refractory batch. The reaction occurs entirely during the high-intensity mixing cycle of the phosphate-bonded refractory product being manufactured. In a high-intensity mixer, the duration of the complete mixing cycle is four to five minutes. It is critical that any source of external heat energy, either by conduction, convection, and/or radiation, not be applied to the refractory batch at any time during the mixing cycle or after packaging of the finished product prior to the installation of the refractory in service. The application of heat will result in the reduction of the workability, i.e., plasticity, of the product to the extent that the product is unusable. The true character of the proto aluminum orthophosphate is not known. It is believed, however, that the reaction product is an aluminum acid orthophosphate ($AlHPO_4$) or an aluminum orthophosphate gel or paste. The reaction product is an amorphous white paste formed in situ and distributed uniformly within the matrix of the product manufactured. The aluminum orthophosphate paste provides a coating for the refractory grains, and acts not only as a binder for the refractory aggregate, but also provides plasticity and workability to the finished product. The stoichiometry of the binder at a ratio of 1 mole of $Al_2O_3$ to 1 mole of $P_2O_5$ is required to yield an extended shelf life for the finished product without the addition of sequestering agents, such as citric acid or oxalic acid. Were excess phosphorus pentoxide ($P_2O_5$) introduced into the batch, the shelf life of the finished product would be decreased significantly requiring the addition of sequestering agents. After installation of the refractory specialty product manufactured according to our invention, with the application of heat in the service application, an aluminum orthophosphate ($AlPO_4$ or $Al_2O_3P_2O_5$) ceramic bond is formed progressively with the loss of combined water at temperatures from 212° F. to 1200° F. With continued calcination at temperatures above 1200° F., the aluminum orthophosphate crystallizes in the matrix bonding the refractory aggregate and matrix components.

We are not aware of any technical reference that teaches the manufacture of a phosphate-bonded refractory entirely during the mixing process without the need to first pre-react sources of aluminum and phosphoric acid at temperatures greater than 100° C. to form a proto aluminum phosphate chemical binder.

SUMMARY OF THE INVENTION

Briefly, according to the present invention, there is provided a method of manufacturing a phosphate-bonded refractory product entirely during the mixing cycle by reacting phosphoric acid and alumina derived from one or more sources of finely divided reactive alumina to form a proto aluminum orthophosphate gel or paste binder in the pan of a high-intensity mixer at ambient temperatures. The process comprises the steps of: a) proportioning a size-graded refractory composition including an alumina derived from one or more sources of finely divided reactive alumina; b) blending the ingredients to distribute the finely divided reactive alumina source uniformly through the batch; c) adding up to one half of the required water; d) adding 75 or 85 percent phosphoric acid to the mix in an amount to provide an atomic ratio of aluminum, derived from one or more sources of finely divided reactive alumina, to the phosphorus, derived from the phosphoric acid, of about 1:1; and e) adding the balance of the required water to obtain the desired workability. According to preferred embodiments, the finely divided alumina is β-alumina and/or aluminum hydroxide. Most preferably, the β-alumina is derived from calcined alumina containing 0.1 to 0.7 percent soda equivalent to 1.910 to 13.370 percent β-alumina, and the ratio of 75 percent phosphoric acid to β-alumina is less than 2.429:1 and the ratio of 85 percent phosphoric acid to β-alumina is less than 2.144:1. Preferably, the phosphorus pentoxide ranges from 2.52 to 8.82 percent by weight. Most preferably, the aluminum hydroxide is less than 5.0 percent by weight and the β-alumina is less than 13.370 percent by weight.

DESCRIPTION OF THE PREFERRED EMBODIMENTS

This invention pertains to a method of manufacturing phosphate-bonded refractories having a proto aluminum orthophosphate chemical binder formed entirely during the mixing cycle by reacting orthophosphoric acid ($H_3PO_4$), a source of finely divided β-alumina ($Na_2O.11Al_2O_3$), and tempering water. This reaction is defined by the following equation:

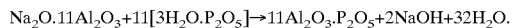

$$Na_2O.11Al_2O_3 + 11[3H_2O.P_2O_5] \rightarrow 11Al_2O_3.P_2O_5 + 2NaOH + 32H_2O.$$

Table I gives the calculated equivalents of the reaction products corresponding to the reaction of 100 parts β-alumina with 182.1654 parts of 100 percent orthophosphoric acid and equivalent parts of 85 percent, 80 percent, and 75 percent orthophosphoric acid. In our co-pending application, we disclose a method of manufacturing phosphate-bonded refractories having a proto aluminum orthophosphate chemical binder formed entirely during the mixing cycle by reacting orthophosphoric acid ($H_3PO_4$), finely divided aluminum hydroxide ($Al(OH)_3$), and tempering water. This reaction is defined by the following equation:

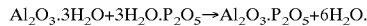

$$Al_2O_3.3H_2O + 3H_2O.P_2O_5 \rightarrow Al_2O_3.P_2O_5 + 6H_2O.$$

Table II gives the calculated equivalents of the reaction products corresponding to the reaction of 100 parts aluminum hydroxide and 125.6249 parts of 100 percent orthophosphoric acid and equivalent parts of 85 percent, 80 percent, and 75 percent orthophosphoric acid. In each of these reactions, an aluminum orthophosphate ($AlPO_4$) ceramic bond is formed progressively with the loss of combined water at temperatures from 212° F. to 1200° F. The true character of the proto aluminum orthophosphate is not known. It is believed, however, that the reaction product is an aluminum acid orthophosphate ($AlHPO_4$) or an aluminum orthophosphate gel. The methods discovered are a direct, simple, and inexpensive method of manufacturing the broadest range of high performance phosphate-bonded refractories at low cost.

We have discovered that it is possible to react orthophosphoric acid with a source of finely divided β-alumina ($Na_2O.11Al_2O_3$) and water in a refractory batch during the mixing cycle. The batch weights of β-alumina ($Na_2O.11Al_2O_3$) and orthophosphoric acid must be calculated to yield a proto aluminum orthophosphate which, on drying and firing to a temperature of approximately 1200° F., will yield an aluminum orthophosphate ceramic bond. The three proportioned batch components, β-alumina, water, and orthophosphoric acid, react in the pan to form a proto aluminum orthophosphate without generating the excessive heat which characterizes exothermic reactions. The ratio of phosphorus pentoxide ($P_2O_5$) in either 85 percent or 75 percent orthophosphoric acid ($H_3PO_4$) to aluminum oxide ($Al_2O_3$) in β-alumina ($Na_2O.11Al_2O_3$) must be less than 1.3923:1. It is absolutely necessary to assure that a slight excess of β-alumina be present to prevent crystallization of aluminum metaphosphate ($Al(PO)_3$). An excess of orthophosphoric acid will result in the development of aluminum metaphosphate directly proportional to the excess phosphoric acid available. The workability of the resultant phosphate-bonded product will be decreased as a function of time; that is, the product will have an attenuated "shelf life".

Three batch components, β-alumina, water, and orthophosphoric acid, react in the pan to form aluminum acid phosphate. After forming the finished product and upon heating to approximately 1200° F., the aluminum acid phosphate progressively loses chemically combined water ultimately forming aluminum orthophosphate.

The commercial availability of β-alumina in sufficient quantity to produce refractory specialty products in the tonnage required by industry is severely limited. Currently, β-alumina is being evaluated as a superionic conductor and is produced in very limited quantity. We have found that calcined aluminas, characterized by soda contents in the range of 0.05 to 0.6 percent, contain β-alumina as the major phase and β-alumina as the minor phase. The β-alumina content of commercially available calcined alumina is in the range of 1.0 to 11.5 percent. Calcined aluminas with a soda content of 0.35 percent (equivalent to 6.7 percent β-alumina) to 0.6 percent (equivalent to 11.5 percent β-alumina) are preferred in the manufacture of refractory specialty products. Calcined aluminas having a soda content of less than 0.35 percent may be used successfully by incorporating aluminum hydroxide in the batch as a second source of reactive alumina. Table III gives the percentage of β-alumina in calcined aluminas in which soda ranges from 0.05 to 0.70 percent and the calculated equivalents of the reaction products corresponding to the reaction of β-alumina with 100 percent orthophosphoric acid and equivalent parts of 85 percent, 80 percent, and 75 percent orthophosphoric acid to form aluminum orthophosphate.

A broad compositional range of sized refractory materials may be used to formulate phosphate-bonded refractories. High alumina aggregates are the most commonly used in phosphate-bonded refractories. Zircon, silica, silicon carbide, chromium oxide, and other non-alumina materials may also be incorporated to modify properties.

In practicing our invention, standard procedures are followed in formulating, proportioning, batching, and mixing. Finely divided calcined alumina, the source of β-alumina, is introduced to the mixer with other dry batch components. The batch is dry mixed for the time required to distribute the β-alumina bearing calcined alumina uniformly through the batch. In high-efficiency mixers, one to two minutes are required to blend a one ton batch. Water is then added while mixing. In mixes, such as mortars and plasters, containing greater than 7.0 percent water, the initial water addition is restricted to 7.0 percent of the total batch weight. The balance of the water is added after the orthophosphoric acid addition. Following the initial water addition, 75 percent or 85 percent orthophosphoric acid is added. The calculated ratio of 85 percent orthophosphoric acid to β-alumina by weight is less than 2.1429:1 and preferably 2.1000:1. The calculated ratio of 75 percent orthophosphoric acid to β-alumina by weight is less than 2.4288:1 and preferably 2.3800:1. The remaining water is added and mixing is completed. When using 75 percent orthophosphoric acid, the free water addition to the batch must be decreased by a factor of 0.1176 of the total weight of the 75 percent orthophosphoric acid addition. After forming the finished product and upon heating to at least 600° F. and preferably to 1200° F., the proto aluminum orthophosphate progressively loses water ultimately forming aluminum orthophosphate.

The β-alumina content of calcined aluminas is dependent upon the soda content. During calcination of calcined aluminas, all soda is reacted with the alumina source to form β-alumina. The soda content of calcined alumina is required to calculate the percentage of the β-alumina component. The phosphorus pentoxide content of the orthophosphoric acid is required to calculate the percentage of orthophosphoric acid required to react with β-alumina to yield an atomic ratio of about 1.0:1.0 of the aluminum in the β-alumina to the phosphorus in the orthophosphoric acid. To practice our invention and to perform these calculations, a supplier's certified chemical analysis of each lot of calcined alumina and orthophosphoric acid starting materials is required. A supplier's certified chemical analysis of each lot of the aluminum hydroxide starting material would also be

TABLE I

CALCULATED EQUIVALENTS OF THE REACTION PRODUCTS OF 100 PARTS BETA ALUMINA WITH 100%, 85%, 80%, AND 75% ORTHOPHOSPHORIC ACID.

| % $Na_2O\cdot11Al_2O_3$ | % $Na_2O$ | % $Al_2O_3$ Reactive | % $Al_2O_3P_2O_5$ Equivalent | % $P_2O_5$ in $Al_2O_3P_2O_5$ | 100% $H_3PO_4$ Equivalent | 85% $H_3PO_4$ Equivalent | 80% $H_3PO_4$ Equivalent | 75% $H_3PO_4$ Equivalent |
|---|---|---|---|---|---|---|---|---|
| 100.00 | 5.2368 | 94.7632 | 226.6844 | 131.9212 | 182.1654 | 214.2969 | 227.7016 | 242.8817 |

TABLE II

CALCULATED EQUIVALENTS OF THE REACTION PRODUCTS OF 100 PARTS ALUMINUM HYDROXIDE WITH 100%, 85%, 80%, AND 75% ORTHOPHOSPHORIC ACID.

| % $Al_2O_3\cdot3H_2O$ | % $H_2O$ | % $Al_2O_3$ Reactive | % $Al_2O_3P_2O_5$ Equivalent | % $P_2O_5$ in $Al_2O_3P_2O_5$ | 100% $H_3PO_4$ Equivalent | 85% $H_3PO_4$ Equivalent | 80% $H_3PO_4$ Equivalent | 75% $H_3PO_4$ Equivalent |
|---|---|---|---|---|---|---|---|---|
| 100.00 | 34.6494 | 65.3506 | 156.3261 | 90.9755 | 125.6249 | 147.7835 | 157.0276 | 167.4961 |

TABLE III

CALCULATED EQUIVALENTS OF THE REACTION PRODUCTS OF BETA ALUMINA IN CALCINED ALUMINA WITH 100%, 85%, 80%, AND 75% ORTHOPHOSPHORIC ACID.

| % $Na_2O\cdot11Al_2O_3$ | % $Na_2O$ in Calcined $Al_2O_3$ | % $Al_2O_3$ Reactive | % $Al_2O_3P_2O_5$ Equivalent | % $P_2O_5$ in $Al_2O_3P_2O_5$ | 100% $H_3PO_4$ Equivalent | 85% $H_3PO_4$ Equivalent | 80% $H_3PO_4$ Equivalent | 75% $H_3PO_4$ Equivalent |
|---|---|---|---|---|---|---|---|---|
| 0.955 | 0.05 | 0.905 | 2.165 | 1.260 | 1.740 | 2.047 | 2.175 | 2.320 |
| 1.910 | 0.10 | 1.810 | 4.330 | 2.520 | 3.480 | 4.094 | 4.350 | 4.640 |
| 3.820 | 0.20 | 3.620 | 8.660 | 5.040 | 6.960 | 8.188 | 8.700 | 9.280 |
| 5.730 | 0.30 | 5.430 | 12.990 | 7.560 | 10.440 | 12.282 | 13.050 | 13.920 |
| 6.683 | 0.35 | 6.335 | 15.155 | 8.820 | 12.180 | 14.329 | 15.255 | 16.240 |
| 7.640 | 0.40 | 7.240 | 17.320 | 10.080 | 13.920 | 16.376 | 17.400 | 18.560 |
| 8.593 | 0.45 | 8.145 | 19.485 | 11.340 | 15.660 | 18.423 | 19.575 | 20.880 |
| 9.550 | 0.50 | 9.050 | 21.650 | 12.600 | 17.400 | 20.470 | 21.750 | 23.200 |
| 10.505 | 0.55 | 9.955 | 23.815 | 13.860 | 19.140 | 22.157 | 23.925 | 25.520 |
| 11.460 | 0.60 | 10.860 | 25.980 | 15.120 | 20.880 | 24.564 | 26.100 | 27.840 |
| 12.412 | 0.65 | 11.765 | 28.145 | 16.380 | 22.620 | 26.611 | 28.275 | 30.160 |
| 13.370 | 0.70 | 12.670 | 30.310 | 17.640 | 24.360 | 28.658 | 30.450 | 32.480 |

A broad range of refractory products, especially refractory specialty products, can be manufactured according to our invention. The method of manufacturing a phosphate-bonded refractory product by forming a proto aluminum phosphate chemical binder entirely during the mixing process by reacting β-alumina and orthophosphoric acid or by reacting aluminum hydroxide and orthophosphoric acid will result in a broad compositional range of products having desirable physical properties. By combining β-alumina and aluminum hydroxide and simultaneously reacting both with orthophosphoric acid in the pan, the physical and chemical properties of the product can be further adjusted to meet those properties required by in-service conditions.

required to calculate the molar ratio of the aluminum in the aluminum hydroxide to the phosphorus in the orthophosphoric acid of about 1.0:1.0.

In general, refractory specialty products, e.g. rams, plastics and plasters, contain 5.0 to 6.0 percent orthophosphoric acid equivalent to 3.0 to 3.6 percent phosphorus pentoxide ($P_2O_5$). Refractory specialty products, such as veneers, liquid sprays, and special coatings, having substantially higher percentages of phosphorus pentoxide, also can be manufactured according to our invention.

All of the batches disclosed in each of the Tables IV–VIII herein have been mixed, formed, and observed for satisfactory formability and shelf life.

Table IV pertains to high alumina phosphate-bonded plastic batches with variable amounts of β-alumina contained in calcined aluminas having 0.55, 0.35 and 0.35 percent soda, 85 percent phosphoric acid and aluminum hydroxide. Water varies in these 10 batches as a function of the 85 percent phosphoric acid and aluminum hydroxide content.

Table V pertains to high alumina phosphate-bonded mortar batches with variable amounts of β-alumina in calcined aluminas having 0.55 and 0.35 percent soda and aluminum hydroxide. The 85 percent phosphoric acid component is varied minimally.

Table VI pertains to high alumina phosphate-bonded veneer batches with substantially greater amounts of phosphoric acid. The β-alumina component of calcined alumina with 0.55 percent soda remains fixed and the aluminum hydroxide component increased progressively.

Table VII pertains to high alumina phosphate-bonded lightweight ram batches with variable amounts of β-alumina contained in calcined aluminas with 0.55, 0.40, and 0.35 percent soda, and aluminum hydroxide. The 85 percent phosphoric acid component is varied minimally.

Table VIII pertains to high alumina phosphate-bonded wet gunnite batches with variable amounts of β-alumina contained in calcined aluminas with 0.60, 0.55, and 0.35 percent soda and aluminum hydroxide. The 85 percent phosphoric acid component is varied minimally.

TABLE IV

HIGH ALUMINA PHOSPHATE-BONDED PLASTIC

| Raw Material | Batch A | Batch B | Batch C | Batch D | Batch E |
|---|---|---|---|---|---|
| 4 × 8 Mesh Calcined Bauxite | 210 | 210 | 210 | 210 | 210 |
| 8 × 20 Mesh Calcined Bauxite | 240 | 240 | 240 | 240 | 240 |
| 20 Mesh Calcined Bauxite | 450 | 450 | 450 | 450 | 450 |
| 35 Mesh Raw Kyanite | 200 | 200 | 200 | 200 | 200 |
| 200 Mesh Volclay | 50 | 50 | 50 | 50 | 50 |
| 325 Mesh Silica (Quartz) | 50 | 50 | 50 | 50 | 50 |
| −200 Mesh Aluminum Hydroxide | 0 | 0 | 20 | 20 | 0 |
| −325 M Calcined (0.55% Soda) Alumina | 500 | 550 | 370 | 415 | 460 |
| −325 M Calcined (0.35% Soda) Alumina | 0 | 0 | 0 | 0 | 0 |
| −325 M Calcined (0.10% Soda) Alumina | 0 | 0 | 0 | 0 | 0 |
| −325 Mesh Calcined Bauxite | 100 | 50 | 210 | 165 | 140 |
| 85% Phosphoric Acid | 110 | 120 | 110 | 120 | 100 |
| Water | 136 | 132 | 130 | 125 | 140 |
| TOTAL | 2046 | 2052 | 2040 | 2045 | 2040 |

| Raw Material | Batch F | Batch G | Batch H | Batch I | Batch J |
|---|---|---|---|---|---|
| 4 × 8 Mesh Calcined Bauxite | 185 | 210 | 210 | 185 | 210 |
| 8 × 20 Mesh Calcined Bauxite | 215 | 240 | 240 | 215 | 240 |
| 20 Mesh Calcined Bauxite | 400 | 450 | 450 | 400 | 450 |
| 35 Mesh Raw Kyanite | 200 | 200 | 200 | 200 | 200 |
| 200 Mesh Volclay | 50 | 50 | 50 | 50 | 50 |
| 325 Mesh Silica (Quartz) | 50 | 50 | 50 | 50 | 50 |
| −200 Mesh Aluminum Hydroxide | 0 | 20 | 60 | 50 | 75 |
| −325 M Calcined (0.55% Soda) Alumina | 0 | 0 | 0 | 0 | 0 |
| −325 M Calcined (0.35% Soda) Alumina | 700 | 570 | 0 | 0 | 0 |
| −325 M Calcined (0.10% Soda) Alumina | 0 | 0 | 540 | 650 | 0 |
| −325 Mesh Calcined Bauxite | 0 | 10 | 0 | 0 | 525 |
| 85% Phosphoric Acid | 100 | 110 | 110 | 100 | 110 |
| Water | 140 | 130 | 116 | 124 | 110 |
| TOTAL | 2040 | 2040 | 2026 | 2024 | 2020 |

TABLE V

HIGH ALUMINA PHOSPHATE-BONDED MORTAR

| Raw Material | Batch A | Batch B | Batch C | Batch D | Batch E |
|---|---|---|---|---|---|
| 20 Mesh Calcined Bauxite | 200 | 200 | 200 | 200 | 200 |
| 48 Mesh Calcined Bauxite | 400 | 400 | 400 | 400 | 400 |
| 35 Mesh Raw Kyanite | 100 | 100 | 100 | 100 | 100 |
| 200 Mesh Volclay | 60 | 60 | 60 | 60 | 60 |
| −200 Mesh Aluminum Hydroxide | 0 | 20 | 0 | 20 | 82 |
| −325 M Calcined (0.55% Soda) Alumina | 550 | 415 | 0 | 0 | 0 |
| −325 M Calcined (0.35% Soda) Alumina | 0 | 0 | 850 | 645 | 0 |
| −325 M Calcined (0.10% Soda) Alumina | 0 | 0 | 0 | 0 | 0 |
| −325 Mesh Calcined Bauxite | 315 | 430 | 15 | 200 | 780 |
| 85% Phosphoric Acid | 120 | 120 | 120 | 120 | 120 |
| Water | 283 | 276 | 283 | 276 | 255 |
| TOTAL | 2028 | 2021 | 2028 | 2021 | 1997 |

TABLE VI

HIGH ALUMINA PHOSPHATE-BONDED VENEERS

| Raw Material | Batch A | Batch B | Batch C | Batch D | Batch E |
|---|---|---|---|---|---|
| 20 Mesh Calcined Bauxite | 180 | 180 | 180 | 180 | 180 |
| 48 Mesh Calcined Bauxite | 360 | 360 | 360 | 360 | 360 |
| 35 Mesh Raw Kyanite | 90 | 90 | 90 | 90 | 90 |
| 200 Mesh Volclay | 65 | 65 | 65 | 65 | 65 |
| −200 Mesh Aluminum Hydroxide | 0 | 20 | 40 | 60 | 80 |
| −325 M Calcined (0.55% Soda) Alumina | 895 | 895 | 895 | 895 | 895 |
| −325 M Calcined (0.35% Soda) Alumina | 0 | 0 | 0 | 0 | 0 |
| −325 M Calcined (0.10% Soda) Alumina | 0 | 0 | 0 | 0 | 0 |
| −325 Mesh Calcined Bauxite | 0 | 0 | 0 | 0 | 0 |
| 85% Phosphoric Acid | 195 | 225 | 255 | 285 | 315 |
| Water | 220 | 204 | 186 | 169 | 152 |
| TOTAL | 2005 | 2039 | 2071 | 2104 | 2137 |

TABLE VII

HIGH ALUMINA PHOSPHATE-BONDED LIGHT WEIGHT RAM

| Raw Material | Batch A | Batch B | Batch C | Batch D | Batch E |
|---|---|---|---|---|---|
| 8 × 20 Mesh 47% Calc. Alumina | 100 | 100 | 100 | 100 | 100 |
| 20 Mesh 47% Calcined Alumina | 200 | 200 | 200 | 200 | 200 |
| 20 M 30% $Al_2O_3$ Hollow Spheres | 525 | 525 | 525 | 525 | 525 |
| 35 Mesh Raw Kyanite | 200 | 200 | 200 | 200 | 200 |
| 200 Mesh Volclay | 50 | 50 | 50 | 50 | 50 |
| −200 Mesh Aluminum Hydroxide | 0 | 20 | 0 | 20 | 82 |
| −325 M Calcined (0.55% Soda) Alumina | 550 | 415 | 0 | 0 | 0 |
| −325 M Calcined (0.40% Soda) Alumina | 0 | 0 | 735 | 0 | 0 |
| −325 M Calcined (0.35% Soda) Alumina | 0 | 0 | 0 | 640 | 0 |
| −325 Mesh Calcined Bauxite | 185 | 300 | 0 | 75 | 650 |
| 85% Phosphoric Acid | 120 | 120 | 120 | 120 | 120 |
| Water | 130 | 123 | 130 | 123 | 102 |
| TOTAL | 2060 | 2053 | 2060 | 2053 | 2029 |

TABLE VIII

HIGH ALUMINA PHOSPHATE-BONDED GUNNITE (WET)

| Raw Material | Batch A | Batch B | Batch C | Batch D | Batch E |
|---|---|---|---|---|---|
| 4 × 8 Mesh Calcined Bauxite | 450 | 450 | 450 | 450 | 450 |
| 8 × 20 Mesh Calcined Bauxite | 300 | 300 | 300 | 300 | 300 |
| 20 Mesh Calcined Bauxite | 400 | 400 | 400 | 400 | 400 |
| 48 Mesh Raw Kyanite | 100 | 100 | 100 | 100 | 100 |
| 200 Mesh Volclay | 50 | 50 | 50 | 50 | 50 |
| 325 Mesh Silica (Quartz) | 25 | 25 | 25 | 25 | 25 |
| −200 Mesh Aluminum Hydroxide | 2 | 13 | 20 | 48 | 102 |
| −325 M Calcined (0.60% Soda) Alumina | 608 | 0 | 0 | 0 | 0 |
| −325 M Calcined (0.55% Soda) Alumina | 0 | 597 | 550 | 0 | 0 |
| −325 M Calcined (0.35% Soda) Alumina | 0 | 0 | 0 | 562 | 0 |
| −325 Mesh Calcined Bauxite | 0 | 0 | 40 | 0 | 508 |
| 85% Phosphoric Acid | 150 | 150 | 150 | 150 | 150 |
| Sisal Fiber 250 | 2 | 2 | 2 | 2 | 2 |
| Water | 60 | 56 | 53 | 43 | 25 |
| TOTAL | 2147 | 2143 | 2140 | 2130 | 2112 |

Having thus described our invention with the detail and particularity required by the Patent Laws, what is desired protected by Letters Patent is set forth in the following claims.

We claim:

1. A method of manufacturing a phosphate-bonded refractory product entirely during the mixing cycle by reacting phosphoric acid and alumina derived from a source of finely divided reactive alumina comprising β-alumina to form a proto aluminum orthophosphate gel or paste binder in the pan of a high-intensity mixer at ambient temperatures comprising the steps of:
   a) proportioning ingredients of a size-graded refractory composition including a source of finely divided reactive alumina comprising β-alumina;
   b) blending the ingredients to distribute the finely divided reactive alumina source uniformly through the batch;
   c) adding up to one half of the required water;
   d) adding 75 or 85 percent phosphoric acid to the mix in an amount to provide an atomic ratio of aluminum, derived from a source of finely divided reactive alumina, to the phosphorus, derived from the phosphoric acid, of about 1:1 such that the source of finely divided reactive alumina and phosphoric acid react in the pan of the high-intensity mixer; and e) adding the balance of the required water to obtain the desired workability.

2. A method of manufacturing a phosphate-bonded refractory product entirely during the mixing cycle by reacting phosphoric acid and a source of reactive alumina derived from finely divided β-alumina or finely divided β-alumina and aluminum hydroxide to form a proto aluminum orthophosphate gel or paste binder in the pan of a high-intensity mixer at ambient temperatures comprising the steps of:

a) proportioning ingredients of a size-graded refractory composition including a source of reactive alumina derived from finely divided β-alumina or finely divided β-alumina and aluminum hydroxide;

b) blending the ingredients to distribute the reactive alumina uniformly through the batch;

c) adding up to one half of the required water;

d) adding 75 or 85 percent phosphoric acid to the mix in an amount to provide an atomic ratio of aluminum, derived from the reactive alumina, to the phosphorus, derived from the phosphoric acid, of about 1:1 such that the source of finely divided reactive alumina and phosphoric acid react in the pan of the high-intensity mixer; and e) adding the balance of the required water to obtain the desired workability.

3. A method defined by claim 2 in which the β-alumina is derived from calcined alumina containing 0.1 to 0.7 percent soda equivalent to 1.910 to 13.370 percent β-alumina.

4. A method defined by claim 2 in which the ratio of 75 percent phosphoric acid to β-alumina is less than 2.429:1 and the ratio of 85 percent phosphoric acid to β-alumina is less than 2.144:1.

5. A method defined by claim 2 in which the phosphorus pentoxide ranges from 2.52 to 8.82 percent by weight.

6. A method defined by claim 2 in which the aluminum hydroxide is less than 5.0 percent by weight and the β-alumina is less than 13.370 percent by weight.

* * * * *

UNITED STATES PATENT AND TRADEMARK OFFICE
CERTIFICATE OF CORRECTION

PATENT NO. : 6,740,299 B2
DATED : May 25, 2004
INVENTOR(S) : Carini et al.

It is certified that error appears in the above-identified patent and that said Letters Patent is hereby corrected as shown below:

Title page,
Item [*] Notice, delete "Subject to any disclaimer, the term of this patent is extended or adjusted under 35 U.S.C. 154(b) by 336 days." and insert in its place
-- [*] Notice: The term of this patent shall not extend beyond the expiration date of U.S. Patent No. 6,258,742. --

Signed and Sealed this

Thirtieth Day of November, 2004

JON W. DUDAS
*Director of the United States Patent and Trademark Office*